Aug. 24, 1926.

B. W. ST. CLAIR 1,597,487

RECORDING DEVICE

Filed Dec. 26, 1924

Inventor:
Byron W. St. Clair,
by
His Attorney.

Patented Aug. 24, 1926.

1,597,487

UNITED STATES PATENT OFFICE.

BYRON W. ST. CLAIR, OF LYNN, MASSACHUSETTS, ASSIGNOR TO GENERAL ELECTRIC COMPANY, A CORPORATION OF NEW YORK.

RECORDING DEVICE.

Application filed December 26, 1924. Serial No. 758,048.

My invention relates to recording devices suitable for use with curve drawing instruments and in particular to such a device which eliminates the use of ink and frictional contact between the recording stylus and the record sheet, and which thus avoids the disadvantages incidental to these features.

In carrying my invention into effect, I provide a record sheet which is chemically sensitive to radiant energy such as light or heat rays so as to have its color changed thereby and provide a recording arm capable of transmitting such rays from a suitable source to the record sheet. The recording arm is moved adjacent the record sheet in accordance with the quantity to be recorded in the usual way and a concentrated ray of the radiant energy is directed thereby upon the record sheet so that due to the chemical action produced a line is traced upon the record sheet when the recording arm and sheet are moved relative to one another. A recording arm which is particularly suitable for this purpose is made from clear fused quartz, this substance having remarkably efficient properties of radiant ray transmission.

Figure 1:
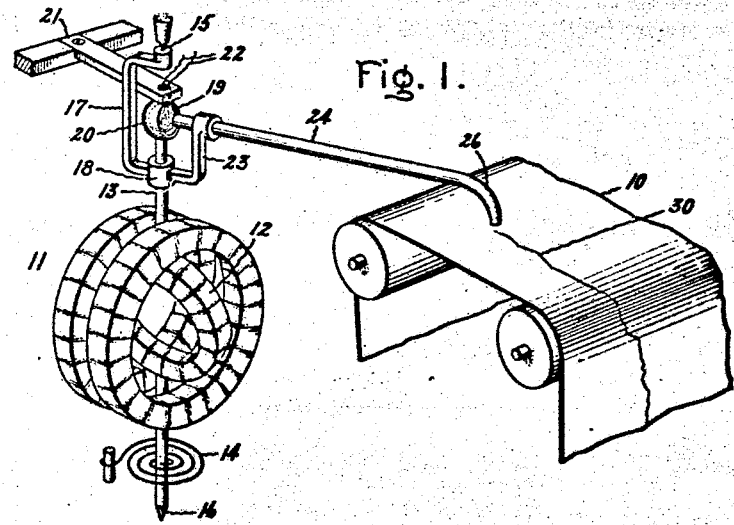
Figure 2:
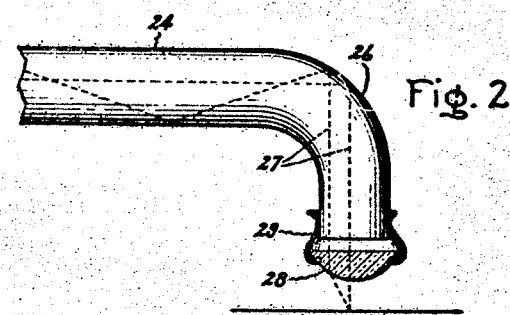
Figure 3:
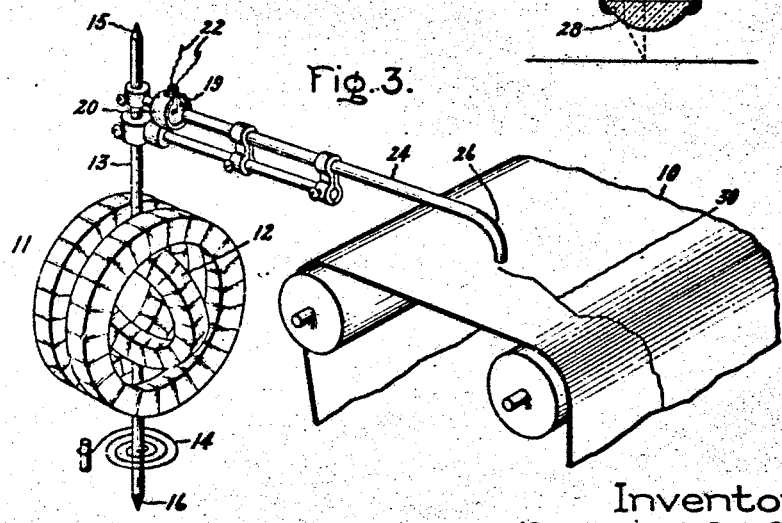

The features of my invention which are believed to be patentable will be pointed out in the claims appended hereto. For a better understanding of the invention, reference is made in the following description to the accompanying drawing in which Fig. 1 shows a preferred arrangement for carrying out the invention where the radiant energy source is stationary; Fig. 2 shows how the radiant energy rays may be concentrated upon the record sheet so as to obtain a thin line record; and Fig. 3 represents a further modification of the invention where the radiant energy source is carried on the moving part of the instrument.

Referring to Fig. 1 of the drawing, 10 represents a record sheet which is chemically sensitive to radiant energy. This record sheet may be a photographic film suitably protected from external light, or it may be a record sheet, such as is described in United States Letters Patent No. 1,406,507, Tuttle, which is treated with a solution such as copper nitrate and which produces a local coloring or staining of the record sheet due to the application of heat. For the purpose of this discussion, the record sheet will be considered to be of the latter style. 11 is a measuring instrument here represented as an electric measuring instrument having a movable element 12 secured to a shaft 13. The moving part is provided with the usual counter torque spring 14 and bearings 15 and 16. The upper portion of the shaft has an offset section 17 secured to the main portion 13 at 18 so as to permit a stationary source of radiant energy 19 to be placed on the axis of rotation. This source comprises in this instance an electric lamp. The lamp is provided with a reflector 20 and this unit is secured to a stationary arm 21. Electric leads 22 are provided to energize the lamp. Carried by shaft 13 on an arm 23 is the recording arm 24. This arm is made of a material, preferably clear fused quartz, having the properties necessary for its function, which is to efficiently transmit radiant energy rays from source 19 to the record sheet 10. The parts are so positioned that as the shaft 13 is turned to swing the recording arm over the record sheet, the inner end of the recording arm will swing in a small arc closely adjacent the open side of the source 19 where it will be directly exposed to the concentrated rays emitted therefrom. Ordinarily, the closure of the reflector may be somewhat more complete than is here represented, it being understood that the present illustration is for the sake of clarity and not necessarily to show the most efficient arrangement of the parts. Clear fused quartz has the remarkable property of transmitting about 93% of the light rays therethrough and this is true even though the section of the quartz rod be bent as represented at 26 because the rays are internally reflected as represented in Fig. 2 at 27. Quartz also transmits ultra-violet and heat rays in the same manner. In the present case radiant energy rays such as heat rays are focused upon the inner end of the recording arm 24 and are transmitted to the opposite end adjacent the record sheet with no material loss from the sides of the rod.

The recording end of the rod is preferably shaped or otherwise arranged so as to concentrate the emitted rays to a small area on the record sheet. One way of accomplishing this is shown in Fig. 2 where a condensing lens 28 is secured to the end of the quartz tube by spring clips 29. The distance of the lens from the record sheet is such that the energy rays are for the most part confined to a very small area on the record sheet so that the chemical action produced by such rays in the chemical active substance of the record sheet leave a thin clear line 30 of a brownish black color.

In such a recording device friction between the record sheet and recording stylus is eliminated. Likewise, there is no frictional engagement between the source 19 and the inner end of the recording arm 24. Ink is unnecessary and consequently the record sheet and arm may be placed in any position while the record shows up on both sides of the record sheet. Since ink is eliminated, the recording arm is always of the same weight which is highly desirable in a delicate measuring instrument.

The modification of Fig. 3 differs from that shown in Fig. 1 in that the source 19 is secured to the shaft 13 and is moved with it instead of being stationary as in Fig. 1.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is,—

1. In a recording device, a record sheet sensitive to radiant energy rays, a source of radiant energy, and a recording arm made of a solid material capable of transmitting radiant energy rays by internal refraction and having one end exposed to radiant energy from said source and the other end positioned adjacent to said record sheet.

2. In a recording device, a record sheet sensitive to radiant energy rays, a recording arm arranged to swing over said record sheet about an axis of rotation, said arm being made of a material which is capable of transmitting radiant energy rays, a source of radiant energy located substantially on the axis of rotation of said arm, and means for directing energy rays from said source onto the adjacent end of said arm.

3. In a recording device, a record sheet sensitive to radiant energy rays, a source of radiant energy, a recording arm made of a solid material capable of transmitting radiant energy rays by internal refraction and having one end exposed to radiant energy rays from said source and the other end positioned adjacent to said record sheet, and means for concentrating the rays emitting from the recording end of said arm upon a small area of the adjacent record sheet.

4. In a recording device, a record sheet sensitive to radiant energy rays, a source of radiant energy, a recording arm made of clear fused quartz having one end exposed to radiant energy from said source and the other end positioned adjacent to said record sheet.

5. Recording apparatus comprising a measuring instrument, a record sheet sensitive to radiant energy rays, a radial recording arm moved by said measuring instrument over said record sheet, said recording arm being made of clear fused quartz, and a source of radiant energy positioned adjacent the inner end of said arm to which said end is exposed.

6. Recording apparatus comprising a shaft, a radial recording arm carried by said shaft, said arm being made of clear fused quartz, a stationary source of radiant energy positioned on the axis of rotation of said shaft adjacent the inner end of said recording arm, means for concentrating the rays of energy emitted from said source onto the adjacent end of said arm, and a record sheet chemically sensitive to radiant energy rays with which the outer end of said recording arm cooperates to produce a record.

7. Recording apparatus comprising a heat sensitive record sheet, a source of radiant heat energy, and a recording arm made of clear fused quartz having one end exposed to said source and the other end positioned adjacent to said record sheet.

8. Recording apparatus comprising a record sheet which is sensitive to radiant energy, a source of radiant energy, and a recording arm made of a solid transparent material having a high refractive value and having one end exposed to said energy source and the other end positioned adjacent to said record sheet.

In witness whereof, I have hereunto set my hand this fifteenth day of December, 1924.

BYRON W. ST. CLAIR.